No. 674,478. Patented May 21, 1901.
F. A. SEIBERLING.
SOLID RUBBER VEHICLE TIRE.
(Application filed Oct. 6, 1900.)

(No Model.)

Witnesses:
W. F. Good
Anna S. Lee

Inventor:
Frank A. Seiberling,
By Humphrey & Humphrey,
Attys.

UNITED STATES PATENT OFFICE.

FRANK A. SEIBERLING, OF AKRON, OHIO.

SOLID-RUBBER VEHICLE-TIRE.

SPECIFICATION forming part of Letters Patent No. 674,478, dated May 21, 1901.

Application filed October 6, 1900. Serial No. 32,288. (No model.)

*To all whom it may concern:*

Be it known that I, FRANK A. SEIBERLING, a citizen of the United States, residing at Akron, in the county of Summit and State of Ohio, have invented a certain new and useful Improvement in Solid-Rubber Vehicle-Tires, of which the following is a specification.

My invention has relation to improvements in that class of vehicle-tires in which the wood felly is surrounded by a metal tire on which is secured an outside tire of flexible vulcanized rubber having embedded longitudinal wires to bind the rubber against escape, and is an improvement on the device for which I made an application for Letters Patent of the United States on September 21, 1900, Serial No. 30,925.

The object of my invention is to provide additional means for securing the rubber tire in place and especially to prevent buckling between the cross-bolts that bind the side annular plates together.

To the aforesaid object my invention consists in the peculiar and novel construction, arrangement, and combination of parts hereinafter described and then specifically pointed out in the claims, reference being had to the accompanying drawings, forming a part of this specification.

Figures 1, 2:
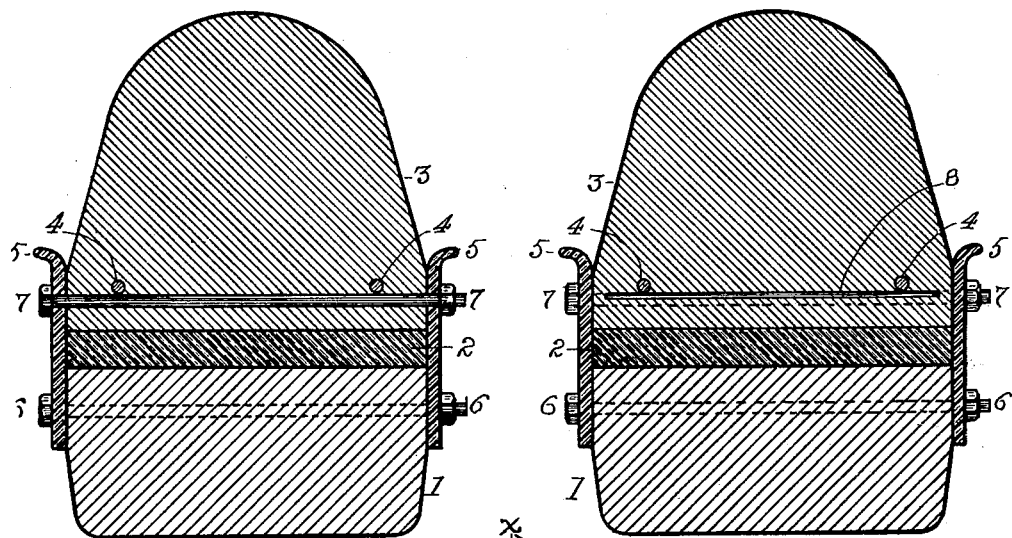
Figure 3:
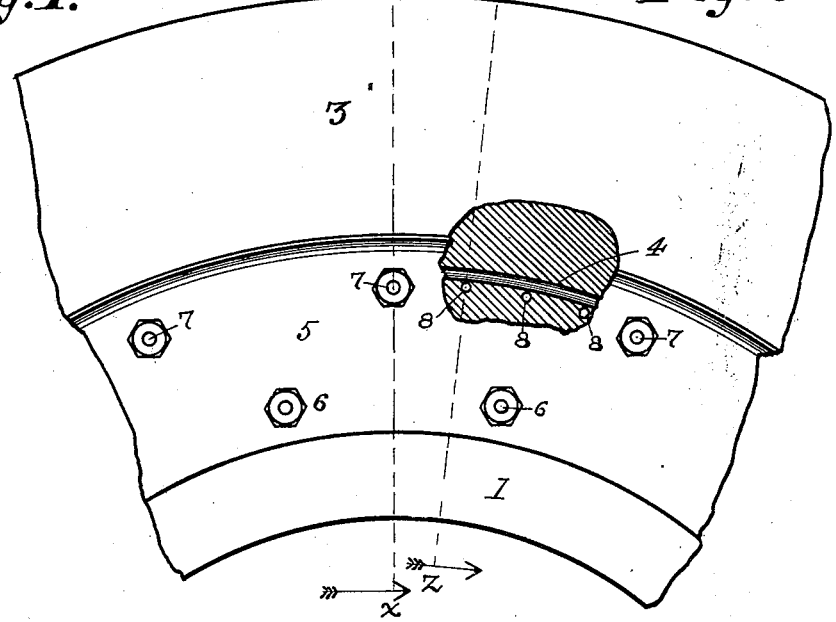

In the accompanying drawings, in which similar reference-numerals indicate like parts in the different views, Figure 1 is a section of the rubber-tire wires, metal tire, side plates, and wood felly, showing one of the retaining-bolts, and at the line $x$ $x$ of Fig. 3; Fig. 2, a section of the same between the retaining-bolts at the line Z Z of Fig. 3 to show the supplemental securing-wires; and Fig. 3, a side elevation of a portion of the felly, side plate, and rubber tire partially broken away to show the arrangement of the wires.

Referring to the figures, 1 is the wood felly, and 2 the metallic tire, which is a plain endless band, on which is the solid-rubber tire 3 of practically the ordinary type in cross-section with a flat base and substantially straight sides for a distance thence sloping inward and curved at the top or tread portion. This rubber portion is made and vulcanized annular or endless, with two endless parallel wires 4 embedded and vulcanized therein. As in the case hereinbefore referred to this rubber portion is made of such internal size as will require a slight pressure to force it from one side onto the iron tire, where it will press with considerable tension force.

When the rubber portion has been placed on the metal tire, annular plates 5, with the outer periphery curved outward and of sufficient width to cover the outer portion of the felly, the iron tire, and the substantially flat portion of the rubber, and to extend slightly above the corner where the sloping part commences, are placed on opposite sides of the wheel and secured to the felly by bolts 6, passing through at intervals about the wheel. Similar bolts 7 pass through the plates 5 and rubber tire 3, and preferably touching the wires 4, and so placed as to be intermediate of the bolts 6.

As thus far described this device does not differ essentially from the case hereinbefore referred to. The additional and novel feature is as follows: Inclosed in the rubber tire at intervals, in substantially the circumferential line of the bolts 7 and intermediate thereof and vulcanized in the rubber, are a number of short cross wires or rods 8, slightly less in length than the width of the rubber tire to permit the compression of the latter, and these wires are arranged to bear against the wires 4. These wires 8, while not materially adding to the weight of the tire, will by holding against the wires 4 prevent the swelling or buckling of the rubber tire between the bolts 7.

I claim as my invention—

1. An improved tire consisting of an annularly-constructed rubber band having in section a flat base and a rounded tread portion, and inclosing endless longitudinal parallel wires and cross-wires arranged to engage the inner periphery of said parallel wires, said longitudinal and cross wires being wholly embedded within said tire, substantially as shown and described.

2. An improved tire consisting of an annularly-constructed rubber band having in section a flat base and a rounded tread portion, with endless longitudinal parallel wires, and cross-wires less in length than the width of said tire arranged to engage the inner periphery of said parallel wires, said longitudinal and cross wires being wholly embedded in said tire and vulcanized therein, substantially as shown and described.

3. The combination in a wheel, of a felly, a metallic tire, an endless rubber tire surrounding and resting on the metal tire, having parallel endless longitudinal wires, and a series of cross-wires arranged at intervals and adapted to engage and press against the inner periphery of the endless wires, said longitudinal and cross wires being wholly embedded and vulcanized therein, substantially as shown and described.

4. The combination in a wheel, of a felly, a metallic tire, an endless rubber tire surrounding and resting on the metal tire, and having endless wires embedded therein, with oppositely-disposed annular plates arranged to cover adjacent parts of the felly and rubber tire, and two series of bolts, one whereof passes through the plates and felly at intervals and the other through the plates and rubber at intervals, and a series of rods located in said tire between said retaining-bolts to lie within the retaining-plates, and between said first series of bolts, substantially as shown and described.

In testimony that I claim the above I hereunto set my hand in the presence of two subscribing witnesses.

FRANK A. SEIBERLING.

In presence of—
C. P. HUMPHREY,
C. E. HUMPHREY.